United States Patent [19]

Spitler

[11] Patent Number: 5,396,993

[45] Date of Patent: Mar. 14, 1995

[54] KITCHEN UTENSIL HOLDER

[76] Inventor: Carol Spitler, 1400 N. Alma School Rd., Chandler, Ariz. 85224

[21] Appl. No.: 155,851

[22] Filed: Nov. 23, 1993

[51] Int. Cl.⁶ .............................................. A47F 7/00
[52] U.S. Cl. ..................................... 211/13; 248/37.3; 248/413; 211/70.7; D7/637
[58] Field of Search .................. 211/70.7, 207, 13, 41; 248/37.3, 161, 411, 413; D7/637, 638

[56] References Cited

U.S. PATENT DOCUMENTS

| D. 255,311 | 6/1980 | Dunne | D7/637 |
| D. 301,105 | 5/1989 | Maxwell | D7/637 |
| D. 311,651 | 10/1990 | Fetty | D6/462 |
| D. 320,332 | 10/1991 | Fetty | D7/638 |
| 1,807,500 | 5/1931 | West | 248/413 |
| 2,086,980 | 7/1937 | Kirby | 248/413 |
| 2,664,005 | 12/1953 | Kosinski | D7/637 X |
| 5,127,616 | 7/1992 | Carney | 248/37.3 X |

Primary Examiner—Robert W. Gibson, Jr.
Attorney, Agent, or Firm—Roger A. Marrs

[57] ABSTRACT

A holder or stand is disclosed herein having a base formed with a central depression and a notched rail for supporting a kitchen implement. A pair of raised receptacles carried on the base may insertably receive other implements while an upright adjustable post supports a yoke or bifurcated member for slidably receiving and supporting a pot or pan lid. The holder or stand may be readily disassembled for cleaning or maintenance purposes.

3 Claims, 1 Drawing Sheet

U.S. Patent     Mar. 14, 1995     5,396,993
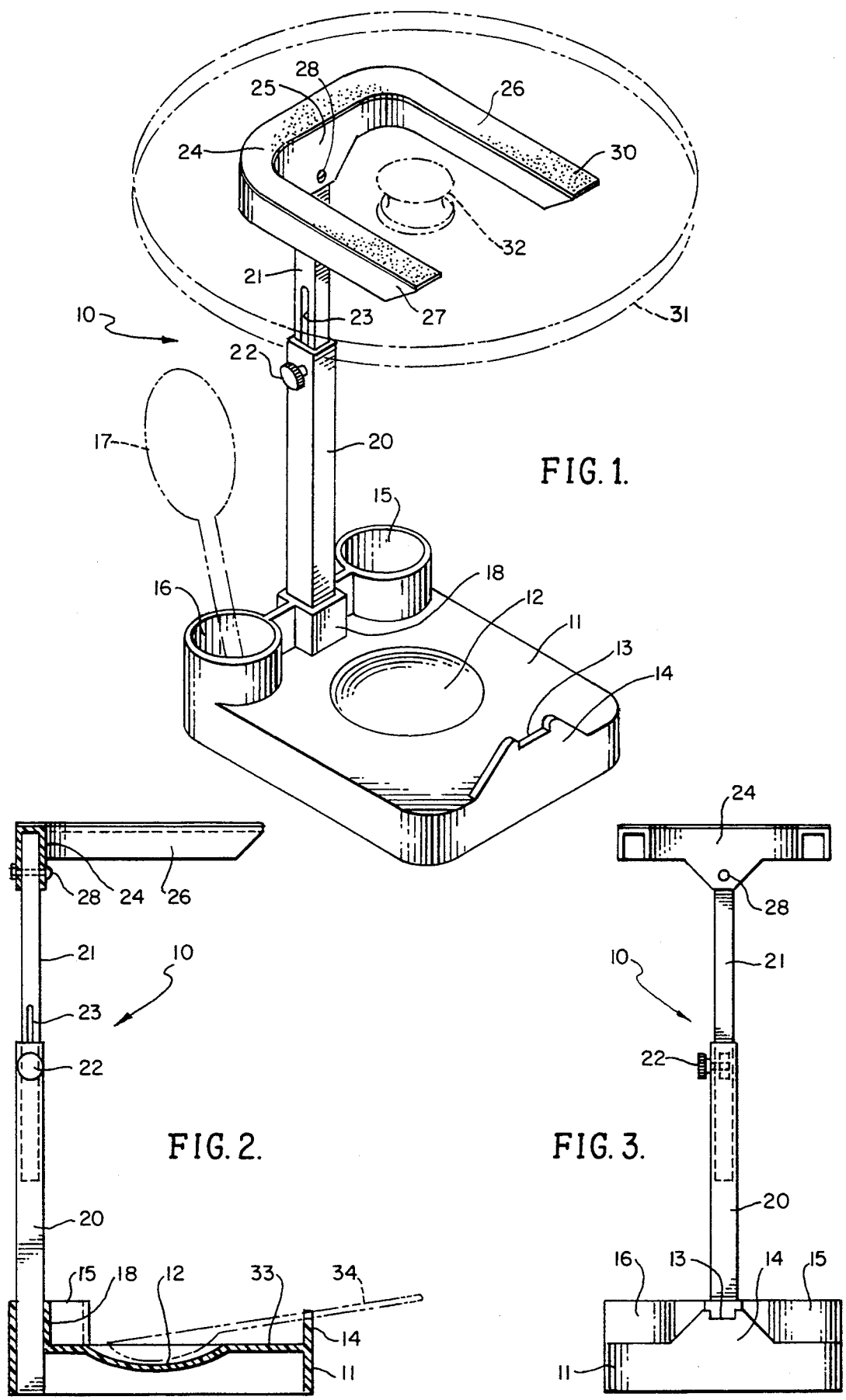

KITCHEN UTENSIL HOLDER

BACKGROUND OF THE INVENTION

1. Field of the Invention

The present invention relates to the field of kitchen accessories, and more particularly to a novel stovetop stand or holder for temporarily storing or holding kitchen implements when not in use during a cooking procedure.

2. Brief Description of the Prior Art

In the past, during a cooking procedure, it was customary for the cook to use a variety of implements, such as spoons, forks or the like, as well as pots and pans which have removable lids. At various times, the cook may leave a pot or pan in a cooking position without its lid and in other instances, spoons may be used and then placed aside until needed again. Normally, the cook would employ adjacent counter tops for supporting these implements when not in use. Problems and difficulties have been encountered when employing this procedure inasmuch as food on the implement would run or drain onto the counter top so that cleaning of the top was necessary and in some instances, spillage might even have occurred to the point where the product would drip or drain onto the floor. Likewise, when employing pan or pot lids, moisture or the like collects on the inside and drains onto the counter top when the lid is supported thereon.

Therefore, a long-standing need has existed to provide a novel holder or stand for supporting a variety of kitchen utensils or implements during a cooking procedure so that not only are the implements temporarily stored in a convenient manner but any dripping or drainage of food product will be captured on the device and not permitted to run on the counter.

SUMMARY OF THE INVENTION

Accordingly, the above problems and difficulties are avoided by the present invention which provides a novel kitchen utensil holder or stand having a base with a central depression and a side rail with a notch provided therein so that, in combination, a selected kitchen utensil can be supported thereby. The base also supports a pair of open receptacles intended to store other kitchen utensils in a convenient and sanitary manner and an upright post including height adjustable means is included for supporting a yoke or bifurcated member intended to slidably receive and support a pot or pan lid.

Therefore, it is among the primary objects of the present invention to provide a novel kitchen utensil holder which will support a variety of kitchen implements, such as pot lids, spoons, forks or the like, and which will serve to collect any food products, drippings or contents so that such food product will not reach the counter top.

Another object of the present invention is to provide a novel means for temporarily storing a variety of kitchen utensils so that they may be readily at hand for the cook during a cooking procedure and yet will be arranged in an orderly fashion preventing food product drippings or the like from engaging or collecting on an adjacent counter top.

Still a further object of the present invention is to provide a novel kitchen utensil accessory which may be readily disassembled for service and maintenance purposes as well as for cleaning and wherein such an assembly does not require the use of special knowledge or special tools.

Another object of the present invention is to provide a novel kitchen implement holder which is adjustable for height and which may also include a variety of receptacles for holding any one of a number of kitchen utensils.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view showing the novel kitchen utensil holder of the present invention;

FIG. 2 is a cross-sectional view of the kitchen utensil holder shown in FIG. 1; and FIG. 3 is a front elevational view of the kitchen utensil holder shown in FIGS. 1 and 2.

DESCRIPTION OF THE PREFERRED EMBODIMENT

Referring to FIG. 1, the novel kitchen utensil holder or stand is illustrated in the general direction of arrow 10 which includes a base 11 that may be supported on the top of a counter or stove during a cooking procedure. The base includes a central recess or depression 12 adapted to receive a kitchen implement, such as a spoon or fork whereby any drippings will be contained within the recess while the elongated handle of the implement may rest in a notch 13 carried on a rail 14 integrally formed at the front of the base 11.

At the rear of the base, a pair of receptacles 15 and 16 are provided along the rear edge marginal region wherein the receptacles are open-ended and adapted to receive a cooking implement such as a spoon, as indicated by numeral 17 in broken lines. In this fashion, any food product drippings will be collected by the receptacles and in some instances, it is to be understood that the receptacles may be removable from the base 11 or, as illustrated, the receptacles may be integrally formed therewith.

Disposed between the receptacles 15 and 16, there is provided a socket 18 on the base 11 which supports an upright post 20 having an extension 21 which is adjustably attached to one end of the post 20 by means of a threaded nut 22 having a shaft projecting into a recess or slot 23 on the side of extension 21. Therefore, the extension may be moved upward or downward to adjust its height by loosening and then tightening the thumbscrew 22. The free end of extension 21 opposite from its end in telescoping or sliding relationship with post 20 carries a yoke or bifurcated member 24 having an appearance of a U-shaped element. The yoke includes a cross-section 25 having opposite ends which support parallel legs 26 and 27 in fixed parallel spaced-apart relationship. The element 24 is attached to the extension 21 by means of a screw or other suitable fastener, as indicated by numeral 28. If desired, a suitable non-skid material may be placed on the exposed surface of the yoke 24 and such a material is indicated by numeral 30. It is to be understood that such material will cover both legs and the cross member or element of the yoke. As illustrated in broken lines, a pot or pan lid 31 is resting on the yoke 24 and, if desired, the lid can be turned upside down so that the lid knob 32 is disposed between the parallel and spaced-apart legs 26 and 27.

Referring now in detail to FIG. 2, it can be seen that the central recess 12 is substantially below the surface 33 of the base 11 so that any food product drippings will be collected. Also, the rail 14 is of sufficient height to provide a substantial incline for the implement it is supporting, such as the spoon 34 shown in broken lines. Also, it can be seen that the height of the yoke 24 can be adjusted by raising the extension 22 with respect to the support post 20. The end of post 20 may be insertably received within the socket 18 and no fastener is needed for securement. Therefore, the entire assembly including the post may be readily disassembled for cleaning or maintenance purposes.

With respect to FIG. 3, it can be seen that the yoke 24 is secured to the end of extension 21 by the screw 28. Also, the receptacles 15 and 16 are in fixed spaced-apart relationship; however, they may readily be constructed integral with the base 11 or may be removable therefrom.

Therefore, it can be seen that the novel kitchen utensil holder of the present invention provides a novel means for supporting a variety of household implements used during the course of cooking in a convenient and sanitary manner. The stand or holder may readily be disassembled for cleaning purposes and it is intended that the holder be placed adjacent to the cooking area for the convenience of the cook.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A kitchen utensil holder comprising:

a base;

means carried on said base for supporting a kitchen implement;

upright means carried on said base for supporting a cooking pan lid;

adjustment means operably included in said upright means for raising and lowering said upright means with respect to said base;

said implement carrying means comprises a central depression provided in said base in spaced-apart relationship with respect to a raised and notched rail disposed on said base;

said upright means includes a socket carried in said base spaced from said central recess;

a post removably disposed in said socket;

an extension slidably carried on said post; and a yoke secured to said extension and disposed over said base.

2. The invention as defined in claim 1 including:

a pair of open receptacles carried on said base and separated by said socket.

3. The invention as defined in claim 2 including:

non-skid means disposed on said yoke engageable with the cooking pan lid.

* * * * *